US011036835B2

(12) United States Patent
Raman et al.

(10) Patent No.: US 11,036,835 B2
(45) Date of Patent: Jun. 15, 2021

(54) CHALLENGE INTERCEPTOR

(71) Applicant: PAYPAL, INC., San Jose, CA (US)

(72) Inventors: Srinivasan Raman, Hyderabad (IN); Venkateswara Rao Karri, Chennai (IN); Sanjeev Koranga, Santa Clara, CA (US)

(73) Assignee: PayPal, Inc., San Jose, CA (US)

( * ) Notice: Subject to any disclaimer, the term of this patent is extended or adjusted under 35 U.S.C. 154(b) by 272 days.

(21) Appl. No.: 15/966,297

(22) Filed: Apr. 30, 2018

(65) Prior Publication Data

US 2019/0332747 A1 Oct. 31, 2019

(51) Int. Cl.
*G06F 21/31* (2013.01)
*H04L 29/06* (2006.01)

(52) U.S. Cl.
CPC .......... *G06F 21/31* (2013.01); *H04L 63/1425* (2013.01); *G06F 2221/2103* (2013.01); *G06F 2221/2133* (2013.01); *H04L 63/1458* (2013.01)

(58) Field of Classification Search
CPC ............ G06F 21/31; G06F 2221/2133; G06F 2221/2103; H04L 63/081; H04L 63/1441; H04L 63/1425
See application file for complete search history.

(56) References Cited

U.S. PATENT DOCUMENTS

| 2013/0198603 | A1* | 8/2013 | Gokhman | G06F 16/958 |
| | | | | 715/234 |
| 2014/0058811 | A1 | 2/2014 | Gorowitz et al. | |
| 2016/0014084 | A1 | 1/2016 | Hansen | |
| 2016/0119304 | A1 | 4/2016 | Lelcuk et al. | |
| 2016/0294796 | A1* | 10/2016 | Hidayat | H04L 63/08 |

OTHER PUBLICATIONS

International Search Report and Written Opinion issued for International Application PCT/US19/30069 and dated Jul. 17, 2019, ISA/US, 12 pages.

* cited by examiner

*Primary Examiner* — Dao Q Ho

(74) *Attorney, Agent, or Firm* — Haynes and Boone, LLP

(57) ABSTRACT

Systems and methods for detecting and mitigating attacks that exploit vulnerabilities of a website are provided, according to various embodiments described below and herein. A computing device issues a request for a web page that is stored on a server. The server receives a request and issues a response that includes the requested web page and interceptor code injected into the response. The computing device receives the response, renders the web content and generates an interceptor from the interceptor code. The interceptor intercepts requests, responses to dynamically update the webpage and responses containing a challenge. When a computing device issues a request to the server to dynamically update the webpage, the server issues a response to the computing device that includes a challenge. Once computing device issues a request that includes an answer to the challenge, the server validates the answer and issues a response that dynamically updates the webpage.

19 Claims, 5 Drawing Sheets

CHALLENGE INTERCEPTOR

TECHNICAL FIELD

The disclosure generally relates to electronic security and more particularly to verifying that a human and not an automated bot is accessing a website or a web application.

BACKGROUND

Attackers may attempt to exploit web application vulnerabilities to extract information from a web site. For example, attackers may launch a denial of service attack ("DoS") or a distributed denial of service ("DDoS") attack where one or more computing devices (collectively known as bots, in some embodiments) send traffic to a target website or web application. This may cause the targeted website or web application to be overwhelmed with fake traffic, crash, be slow to respond, or become otherwise unavailable to users. In another example, attackers may attempt to repeatedly validate user credentials that the attackers store from other user accounts and if that validation attempt is successful, take over the user accounts.

To minimize the impact of the attacks, websites and web applications implement solutions, such as CAPTCHA and reCAPTCHA. CAPTCHA and reCAPTCHA may be transmitted to a computing device as part of an initial response when the computing device initially requests a webpage from a server.

These conventional solutions, however, do not extend to when a webpage is dynamically updated without being reloaded from the server.

Figure 1:
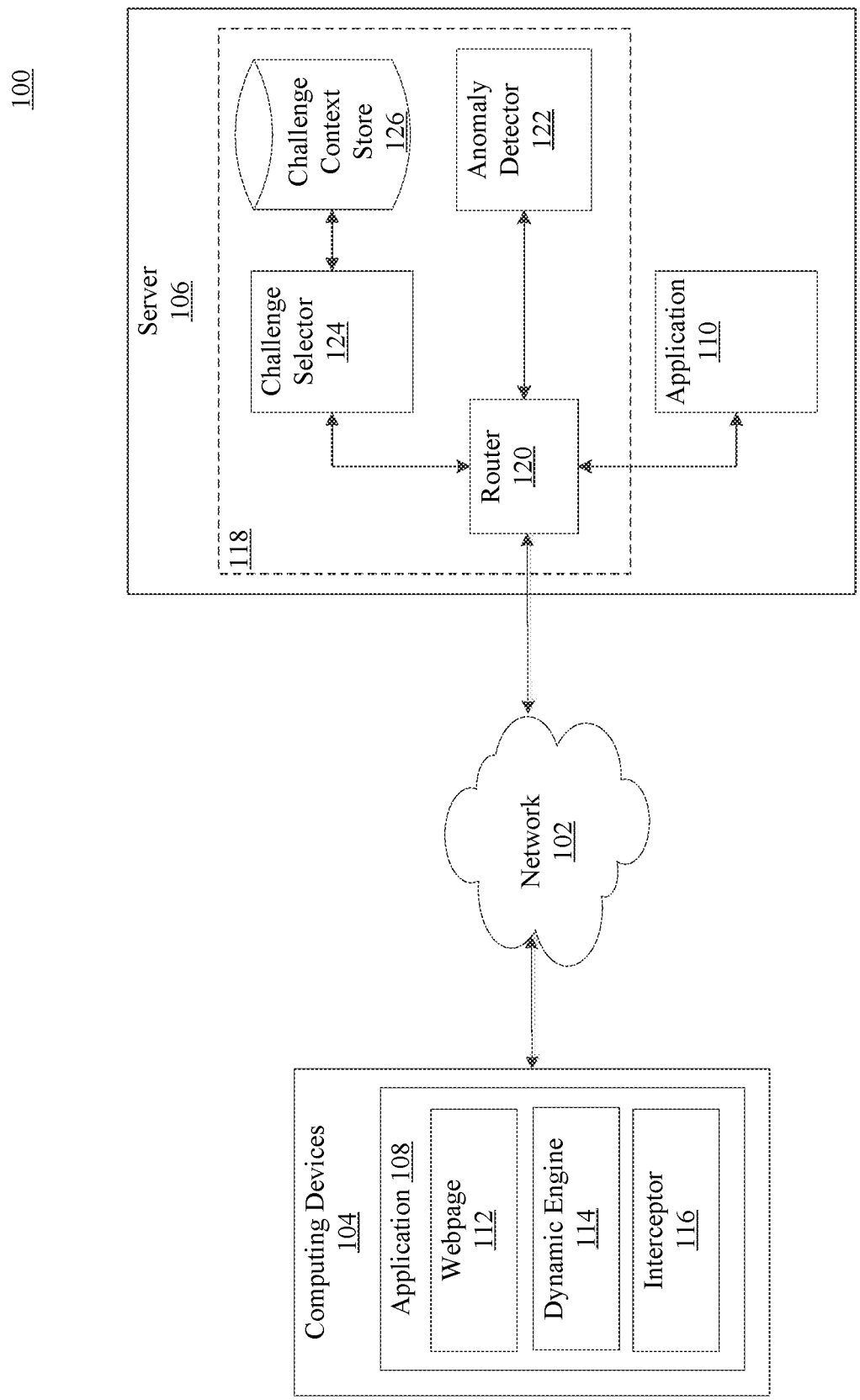
FIG. 1 is an exemplary system where an interceptor can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Webpages may be downloaded from a server for display on a computing device. To display a webpage on the computing device, an application that executes on a computing device may issue a request for a webpage to the server. The server receives the request and may issue a response. The response may include a challenge, such as CAPTCHA or reCAPTCHA. A challenge may ask a user to enter some information that may not be easily entered by a bot. Example information may be an answer to a question, text that corresponds to an obfuscated image, a selection of one or more images from a grid display that have a specific attribute, etc. The response may also include a silent challenge. A silent challenge may include code (such as JavaScript code) that may be downloaded to a browser or an application as part of the response. The code may then execute automatically within the browser or an application to perform a unit of work and submit the output of that unit of work to the server that issued the silent challenge.

An application of a computing device, such as a web browser or an application, may receive the response. If the response includes a challenge, the application displays the challenge or, in case of the silent challenge, executes the silent challenge. In either case, the application may issue an answer to the challenge or an output of the silent challenge back to the server. The server may validate the answer to the challenge or the output of the silent challenge. If the challenge is validated, the server may transmit the webpage to the browser or the application which may render and display the webpage.

In some embodiments, a webpage displayed on a computing device may be dynamically updated. A webpage may be updated when a dynamic web content request is made by an application for web resources stored on the server. These resources may replace a portion of the display webpage without reloading the entire webpage. To issue a dynamic web content request, the application may include a dynamic engine (e.g. particular executable software instructions). The dynamic engine may execute within the application or outside of the application and may issue a request to dynamically update the webpage without interrupting the processing of the application.

In response to receiving the dynamic web content request, the server issues a response that includes web resources that may partially update the webpage in various embodiments. The dynamic engine of the application may receive the response and dynamically update the webpage without reloading the webpage from the server.

Conventional techniques that verify that a webpage was not requested by a bot, are not designed to handle the situation when the webpage is dynamically updated. This is because the dynamic engine receives and processes the dynamic web content response and dynamically updates the webpage, rather than simply attempting to handle a challenge as part of an initial page load. This allows the dynamic update to occur asynchronously from the processing of the application. For example, when a webpage is dynamically updated, a dynamic engine such as an AJAX engine may issue an AJAX (asynchronous java script and XML (extensible markup language)) request to the server and will receive the dynamic update resources in the dynamic web content response. More generally, techniques described herein are not applicable just to the AJAX model for dynamic web content refreshing, but may apply to any similar technique in which a web page, after initially being loaded, updates the web page without a full page refresh for example.

In an embodiment, an application may employ an interceptor to prevent a bot from accessing and/or overwhelming the server when the webpage is dynamically updated. The interceptor, in conjunction with the anomaly detection mechanism of the server, may transparently handle the rendering of a challenge on the computing device. This may occur when the anomaly detection mechanism of the server detects a request to dynamically update the web content that may potentially be issued by a bot and wishes to verify the request by issuing a challenge.

In an embodiment, the interceptor may be installed within the application of a computing device or be injected into the application when the application issues a request to initially load the webpage. The interceptor may intercept a response that includes a challenge that the server issues in response to a dynamic web content request and direct the challenge to the application and not the dynamic engine. For example, when a dynamic engine issues a request to dynamically update the webpage, an interceptor may intercept a response from the server that includes a challenge before the response reaches the dynamic engine. The interceptor then causes the application to render the challenge and receive an answer as user input or to automatically execute the challenge if the challenge is an algorithm that may execute a unit of work and generate an output as the answer to the challenge.

Because a server receives an answer to the challenge before issuing a dynamic web content response that dynamically updates the webpage, the attack by one or more bots may be mitigated or prevented when a webpage is dynamically updated.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

Various components that are accessible to network 102 may be computing devices 104 and servers 106. Computing devices 104 may be portable and non-portable electronic devices under control of a user and configured to transmit, receive, and manipulate data from servers 106. Example computing devices 104 include desktop computers, laptop computers, tablets, smartphones, wearable computing devices, eyeglasses that incorporate computing devices, implantable computing devices, etc.

Servers 106 are also connected to network 102. An example server 106 may be a computing device that includes hardware and software for large scale processing. In another example, server 106 may be a computer program installed on a computing device. Server 106 may be a web server. In an embodiment, server 106 may be maintained by a service provider, such as PAYPAL®, a telephonic service provider, social networking service, and/or other service providers.

In an embodiment, server 106 may also be connected to other servers and/or computing devices that are not accessible to network 102 (not shown). These servers and/or computing devices may communicate with each other using an internal network, such as an intranet network that is not visible to network 102. In this case, the servers and computing devices connected via an internal network may communicate with computing devices 104 through server 106.

In an embodiment, computing device 104 includes application 108. Applications 108 may be downloaded to the computing device 104 from service provider server that may be one of servers 106, be pre-installed on the computing devices 104, installed on the computing device 104 using portable memory storage devices, described below. Applications 108 may execute on computing devices 104 and receive instructions and data from a user, servers 106, and/or from other computing devices 104. In some embodiments, application 108 may be a browser.

As illustrated in FIG. 1, server 106 may include applications 110. Example applications 110 may be payment transaction applications, such as those that may be configured to transfer money world-wide, receive payments for goods and services, manage money spending, etc. Further, applications 110 may be under an ownership or control of a payment service provider, such as PAYPAL®, Inc. of San Jose, Calif., USA, a telephonic service provider, a social networking service provider, and/or other service providers. In another example, applications 110 may also be analytics applications. Analytics applications perform business logic, provide services, and measure and improve performance of services and functions of other applications that execute on computing devices 104 based on current and historical data. In another embodiment, applications 110 may be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 110 may be location detection applications, such as a mapping, compass, and/or global positioning system (GPS) applications. Further, applications 110 may be social networking applications and/or merchant applications.

In an embodiment, applications 110 may include websites. Websites may be a collection of one or more webpages. Application 108 may download one or more webpages from server 106 to computing device 104. For example, application 108 may obtain a webpage, including content and/or data, collectively referred to as a web resource from application 110. Once obtained, application 108 may display the web resource on computing device 104. In some embodiments, the web resource may be displayed as a webpage 112.

To obtain the web resource, application 108 may communicate with application 110 using a using a request message ("request"). The request to application 110 may include a request for a particular webpage 112. In response to the request, application 110 may issue a "response" message ("response"). The response message may include content, such as scripts, code, and data that may be used to render and display the web resource as webpage 112. In some embodiments, the content of the request and response may be written in hypertext markup language ("HTML"), style sheets language, such as ("CSS"), Java script, extensible markup language ("XML"), etc.

In some embodiments, the request and response messages may be transmitted using a Hypertext Transfer Protocol ("HTTP"), a file transfer protocol ("FTP"), or another protocol.

In an embodiment, once application 108 receives a response from application 110, application 108 may render the resources in the response and render webpage 112 on computing device 104.

In an embodiment, webpage 112 may be dynamically updated. Dynamic updates may update a portion of webpage 112 without reloading the entire webpage. Dynamic updates may also be referred to as asynchronous updates of webpage 112. To request dynamic updates, application 108 may use a dynamic engine 114. Dynamic engine 114 may issue a dynamic web content request to application 110 without interfering with processing of application 108. The dynamic web content requests may be AJAX requests in some embodiments. Typically, AJAX may be a combination of several languages, such as HTML, cascading style sheets ("CSS"), JavaScript and XMLHttpRequest objects, to give a few examples.

In an embodiment, the dynamic web content request and dynamic web content response may also be transmitted using a Hypertext Transfer Protocol ("HTTP"), a file transfer protocol ("FTP"), or another protocol.

As discussed above, dynamic web content requests may be issued by dynamic engine 114. This is different from requests to initially load webpage 112 that are issued by application 108. Dynamic engine 114 may execute within application 108 or outside of application 108 (not shown). In an embodiment, dynamic engine 114 may also be included in a response received by application 108 from application 110 that renders webpage 112. Dynamic engine 114 may execute within application 108 as long as application 108 renders webpage 112 on computing device 104.

In an embodiment, dynamic engine 114 may be aware of webpage 112 that is rendered by application 108. Dynamic engine 114 may also be aware of user input that computing device 104 may receive in response to application 108 rendering webpage 112. Dynamic engine 114 may also issue dynamic web content requests that may be sent to application 110 in response to computing device 104 receiving the user input. Further, dynamic engine 114 may be aware of the dynamic web content response that application 110 may send to computing device 104 in response to the dynamic web content request when anomaly detector 122 (described below) determines that the dynamic web content request was not originated from a bot. In an embodiment, dynamic engine 114 may also process the dynamic web content response, including the JavaScript within the dynamic web content response to update webpage 112 without using or interfering with the processing 5 or workload on application 108.

In an embodiment, application 110 may not differentiate between requests issued by application 108 or Internet bots or simply bots. A bot may be a software application that executes on computing devices, such as computing device 104 or another server 106. A bot may emulate a request sent by application 108. However, a bot or a combination of bots may send requests that are highly repetitive and at a higher rate that may be possible by a human who is interfacing with application 108 and webpage 112. Because bots or similar software may issue requests to application 110 at high, repetitive rates, bots may overwhelm application 110 such that applications 110 may be overloaded, crash, unable to provide users with requested content. In another example, a bot may be designed to exploit vulnerabilities or bugs in application 110 in order to extract information, including user information, from application 110. In yet another example, a bot may be designed to use user credentials acquired by unauthorized third parties during a server breach to verify if the same user credentials may be applied to access application 110.

Conventional techniques prevent bots from accessing application 110 when webpage 112 is initially loaded or rendered using application 108. Such techniques, however, do not extend to instances when webpage 112 is dynamically updated. This is because dynamic web content requests and responses are processed by dynamic engine 114 and independent of application 108.

To mitigate the dynamic web content requests to application 110 that were generated by one or more bots, application 110 may inject interceptor code into the response sent back to application 108, or if a bot issued a request, to the bot. This may occur when application 108 issues an initial request for webpage 112 to be downloaded and rendered on computing device 104. When application 110 receives the request, application 110 may issue a response that includes interceptor code together with a web resource that may be used to load webpage 112. An example response may be an HTML response.

When application 108 receives the response that includes the interceptor code, application 108 may execute or interpret the interceptor code and generate interceptor 116. In addition to generating interceptor 116, application 108 may also render webpage 112 included in the response. Alternatively, application 108 may interpret or execute a script that may invoke interceptor 116.

In an embodiment, computing device 104 may receive input when user interacts with webpage 112. The input may include a request to dynamically update webpage 112 and may cause dynamic engine 114 to issue a dynamic web content request. When interceptor 116 is installed as part of webpage 112, dynamic web content request from dynamic engine 114 may invoke interceptor 116. When invoked, interceptor 116 may invoke an actual dynamic web content request mechanism (such as an XMLHttpRequest) provided by application 108 to generate a dynamic web content request to application 110.

In an embodiment, interceptor 116 may also intercept a response from server 106 that includes a challenge and direct those to application 108. The challenge pertains to detecting that a request and/or dynamic web content request may have been issued by a bot, and not by, for example, a user selecting content using webpage 112 rendered by application 108.

As discussed above, interceptor 116 may intercept requests and responses that may dynamically update webpage 112 and also responses that include a challenge to identify that a bot, and not a human using application 108, is trying to access application 110.

For example, in response to a dynamic web content request to application 110, server 106 may return a response that includes a challenge. Interceptor 116 may intercept the response that includes a challenge and pass the challenge to application 108 that may render the challenge. In an embodiment, application 108 may render the challenge using a challenge widget. The rendered challenge may be displayed on the screen of computing device 104 instead of webpage 112 or within webpage 112. In an embodiment, a challenge may display a question that may be included in an image. Typically, the question may be answered by a human, but not a bot.

In an embodiment, application 108 may receive an answer to a challenge and issue a challenge validation request to server 106 that includes the answer to the challenge. In an embodiment, the challenge validation request that includes a challenge may be an HTTP request.

In an embodiment, interceptor 116 may intercept a dynamic web content response, such as an AJAX response, from server 106. Interceptor 116 may receive a dynamic web content response when server 106 validates that the answer to a challenge provided in the challenge request is the correct answer. Once interceptor 116 intercepts dynamic web content response, interceptor 116 may pass the dynamic web content response for processing by dynamic engine 114. As discussed above, dynamic engine 114 may dynamically update content and/or data of webpage 112 that was previously downloaded to computing device 104. For example, interceptor 116 may intercept an AJAX response that includes web resources in JavaScript for dynamically updating webpage 112. Interceptor 116 may then pass the AJAX response to dynamic engine 114 that may execute or interpret the JavaScript included in the AJAX response.

In an embodiment, server 106 may include a threat detection system 118. Although FIG. 1 illustrates threat detection system 118 as being included in a single server 106, the implementation is not limited to this embodiment as threat detection system 118 and components of the threat detection system 118 may be included on multiple servers 106.

In an embodiment, threat detection system 118 includes a router 120, an anomaly detector 122, a challenge selector 124, and a challenge content store 126.

In the illustrated embodiment, router 120 is included within server 106. The implementation however is not limited to this embodiment and router 120 may be outside of server 106, within network 102, etc.

In an embodiment, router 120 may be a layer 7 router. A layer 7 router may route or load balance requests received at server 106 at layer 7 of the Open System Communication model. In particular, a layer 7 router may read the requests received at server 106 and direct the requests to application 110, anomaly detector 122 or challenge selector 124 based on the content of the request. For example, the content of the request may indicate that the request is a request to retrieve webpage 112 (such as an HTTP request issued by application 108) or a dynamic web content request to dynamically update webpage 112 that has previously been downloaded and/or rendered on computing device 104 (such as an AJAX request issued by dynamic engine 114). Additionally, router 120 may forward responses from server 106 to computing device 104. In another embodiment, router 120 may also pass requests and responses between application 110, anomaly detector 122, and challenge selector 124.

For example, router 120 may receive a request to load webpage 112 from application 108 and route the request to application 110. In another example, router 120 may route a request for application 110 to anomaly detector 122. In yet another example, router 120 may route a request to challenge selector 124.

In an embodiment, anomaly detector 122 may receive requests from network 102. The requests may be requests to load webpage 112 or to dynamically update webpage 112. Once received, anomaly detector 122 may determine whether the request is a safe request or may be a potential threat to application 110. A safe request may be generated by a user manipulating webpage 112. A request that is a potential threat may be a request generated by a bot.

In an embodiment, where anomaly detector 122 determines that a request to load webpage 112 is a safe request, anomaly detector 122 may instruct router 120 to route the request to application 110. In an embodiment where anomaly detector 122 determines that a request to load webpage 112 is a potential threat, anomaly detector 122 may pass the request to challenge selector 124.

In an embodiment, application 110 may receive requests to provide a web resource that application 108 may render as webpage 112 on computing device 104. In this case, application 110 may generate a response that includes web resources that may render webpage 112. In an embodiment, when application 110 generates a response, application 110 may also inject the interceptor code into the response. Example interceptor code may be an XmlHttpRequest interceptor JavaScript code. Once application 110 generates the response, application 110 may pass the response to router 120.

In an embodiment, when router 120 receives the response from application 110, router 120 may pass the response to computing device 104. In an embodiment, router 120 may also inject interceptor code into the response. In this embodiment, router 120 and not application 110 may inject interceptor code into the response.

In yet another embodiment, application 110 processes a dynamic web content request that may request a dynamic update of webpage 112. In this case, application 110 may generate a dynamic web content response that may be processed using dynamic engine 114 to update webpage 112. Once application 110 generates a dynamic web content response, application 110 may pass the dynamic web content response to application 108 through router 120.

As discussed above, anomaly detector 122 may detect that a request is a potential threat to application 110. In this case, anomaly detector 122 may route the request to challenge selector 124. The request may be a request to load webpage 112 or be a dynamic web content request.

In an embodiment, challenge selector 124 may generate a challenge. A challenge may determine whether a request was generated by application 108 in response to user input or by a bot. Example challenge may be a "reCAPTCHA", "CAPTCHA", silent JavaScript challenge or another challenge. These challenges generate a question to which a human user using application 108, but not a bot, may provide an answer. To generate a challenge, challenge selector 124 may access challenge context store 126. Challenge context store 126 may be a database or another memory store that stores challenge context data. Example challenge context data may be a challenge and the answer to the challenge. In an embodiment, a challenge may be an image, content included within the image, an audio question, etc. In another embodiment, a challenge may be a silent challenge. The silent challenge may include an executable algorithm in a language such as JavaScript that is meant to execute on computing device 104 and generate an output that challenge selector 124 may interpret as an answer to the challenge. In an embodiment, challenge context store 126 may be a third party service, accessed through a service interface provided by the third party (not shown.) For example, reCAPTCHA challenge may be accessed by means of the challenge selector 124 accessing a Google API (not shown) to retrieve a challenge to be returned computing device 104.

In an embodiment, challenge selector 124 may issue a response containing a challenge to application 108. The response containing a challenge may include a challenge question. In some embodiments, the challenge may be in a Java Script Object Notation ("JSON") format. In an embodiment, the challenge may be processed by application 108 and not dynamic engine 114.

In an embodiment, once challenge selector 124 issues a challenge, challenge selector 124 may store the challenge context and the request or dynamic web content request for which the challenge was issued. In this way, challenge selector 124 may receive an answer to the challenge and use the challenge context to determine whether the challenge was answered correctly or not. Further, if the challenge is answered correctly, challenge selector 124 may cause router 120 to route the previously saved request or the dynamic web content request to application 110.

Figure 2:
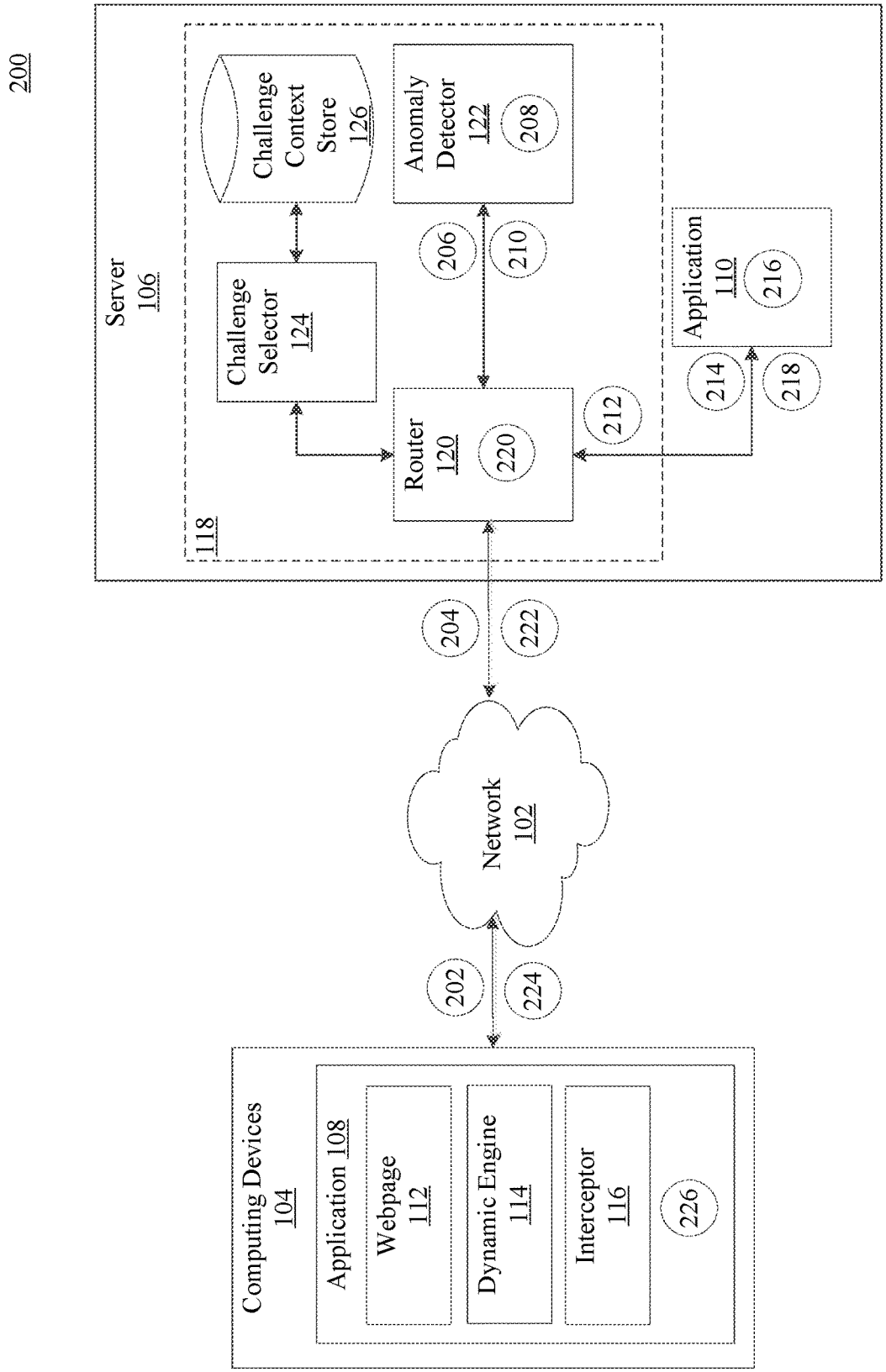
FIG. 2 is a sequence diagram that loads an interceptor into a browser, according to an embodiment.
Figure 3:
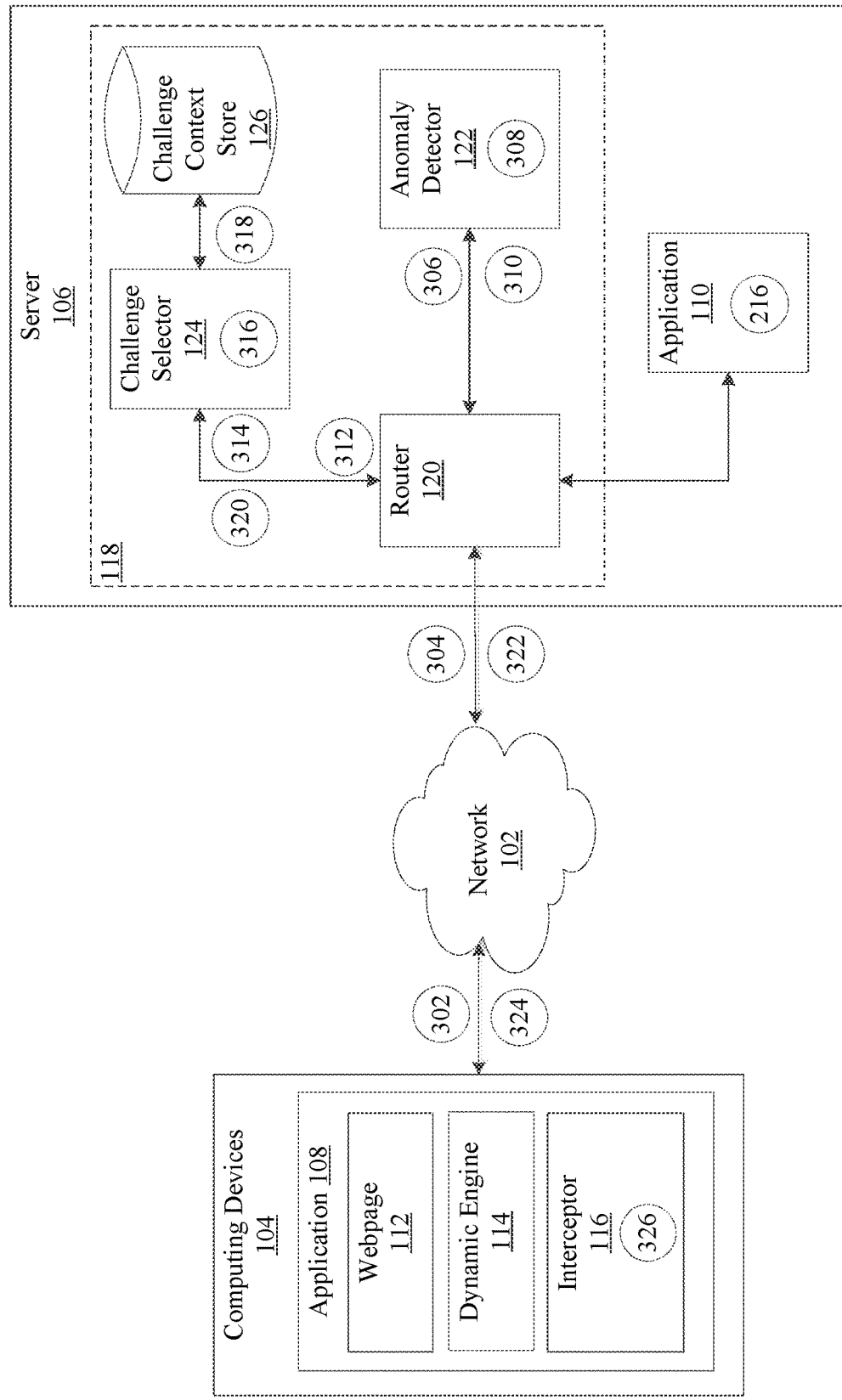
FIG. 3 is a sequence diagram that issues a challenge in response to a request to dynamically update content, according to an embodiment.
Figure 4:
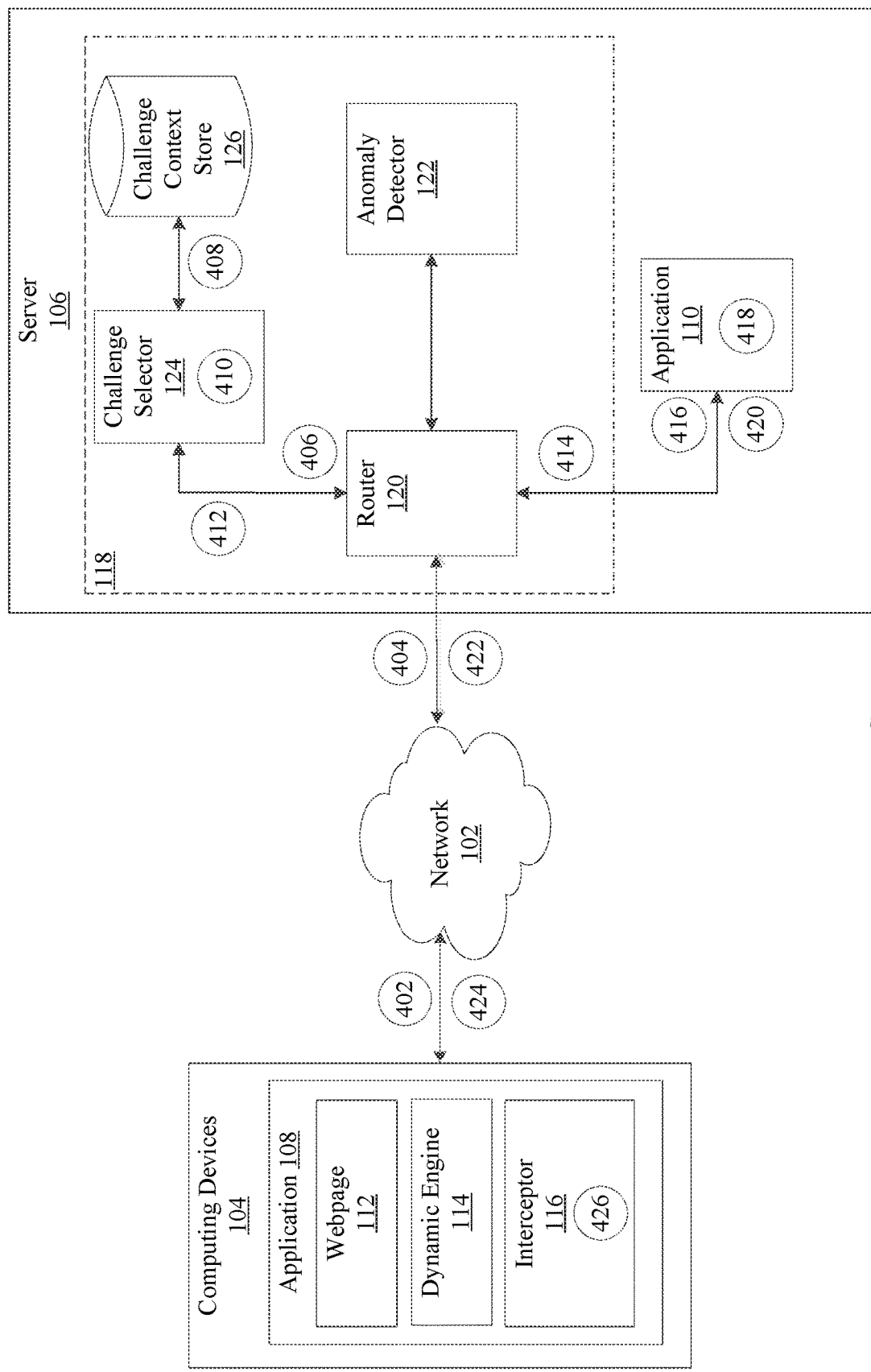
FIG. 4 is a sequence diagram that processes a response to an issued challenge, according to an embodiment.

As discussed above, application 108 may issue requests to load webpage 112 and use dynamic engine 114 to issue requests to dynamically update webpage 112. FIGS. 2-4 are sequence diagrams that illustrate a sequence that installs an interceptor on computing device and attempts to ensure that the dynamic web content requests to dynamically update webpage 112 are issued by application 108 that receives input from a user and not by a bot.

FIG. 2 is a sequence diagram 200 that loads an interceptor into an application, according to an embodiment. Sequence diagram 200 may be implemented using components described in FIG. 1.

At operation 202, application 108 issues a request to retrieve webpage 112. The request may be issued because application 108 receives input from a user. The request may be an HTTP request to load webpage 112 for the first time.

At operation 204, router 120 receives the request. Router 120 may forward the request to anomaly detector 122.

At operation 206, anomaly detector 122 receives the request.

At operation 208, anomaly detector 122 determines that a request is generated by application 108 and not by a bot.

At operation 210, anomaly detector 122 transmits the anomaly detection response to router 120 directing router 120 to transmit the request to application 110.

At operation 212, router 120 may forward the request to application 110.

At operation 214, application 110 receives the request.

At operation 216, application 110 processes the request and generates a response. In an embodiment, the response may be an HTML response that when executed or interpreted by application 108 may render webpage 112 on computing device 104.

At operation 218, application 110 passes the response to router 120.

At operation 220, router 120 injects interceptor code for interceptor 116 into the response. For example, router 120 may inject the XmlHttpRequest interceptor JavaScript code into the HTML response.

At operation 222, router 120 may forward the response with the interceptor code to application 108.

At operation 224, application 108 receives the response containing the interceptor code. For example, application 108 may receive the HTML response containing the injected XmlHttpRequest interceptor JavaScript code.

At operation 226, application 108 executes or interprets the HTML response and renders webpage 112. Additionally, during the rendering, application 108 executes the injected code. This causes interceptor 116 to be installed in application 108 or be invoked on computing device 104. As discussed above, interceptor 116 may intercept dynamic web content requests, dynamic web content responses and responses containing a challenge.

As illustrated in FIG. 2, at operation 220, router 120 injects the interceptor code for interceptor 116 into the response. This embodiment, however, is not limited to router 120 injecting the interceptor code into the response. In another embodiment, after application 110 generates the response, a framework level code in application 110 may inject the interceptor code into the response before the response arrives at router 120. In another embodiment, a service provider that is in the path of the request between application 108 and server 106 may also inject the interceptor code (not shown) into the response.

FIG. 3 is a sequence diagram 300 that issues a challenge in response to a request to dynamically update content, according to an embodiment. Sequence diagram 300 may be implemented using components described in FIG. 1.

At operation 302, application 108 issues a request to dynamically update webpage 112. For example, application 108 may receive input from a user. Example input may be through a keyboard, mouse, touchscreen, voice, etc., input to webpage 112 displayed on computing device 104. In response to the input, dynamic engine 114 may generate a request to dynamically update webpage 112. Example request may be a dynamic web content request or an AJAX request.

At operation 304, router 120 receives the request. Once received, router 120 may forward the request to anomaly detector 122.

At operation 306, anomaly detector 122 receives the request.

At operation 308, anomaly detector 122 determines whether the request may be generated by a bot, and is a potential threat to application 110. When anomaly detector 122 determines that the request is a potential threat, the sequence proceeds to operation 310. Otherwise, anomaly detector 122 may pass the request through router 120 to application 110 which issues a response that may be interpreted to dynamically update webpage 112.

At operation 310, anomaly detector 122 transmits an anomaly detection response to router 120 directing the router 120 to transmit the request to challenge selector 124.

At operation 312, router 120 transmits the request to challenge selector 124.

At operation 314, challenge selector 124 receives the request.

At operation 316, challenge selector 124 generates a challenge. To generate a challenge, the challenge selector 124 may retrieve a challenge context from challenge context store 126. As discussed above, challenge selector 124 may generate a challenge, such as "reCAPTCHA", "CAPTCHA," silent JavaScript, etc. In an embodiment, the challenge may be generated in the form of a JSON document. Challenge selector 124 may include the challenge in the response.

At operation 318, challenge selector 124 stores challenge context in challenge context store 120. This is because challenge selector 124 may use the persisted context to validate the response to the challenge provided from computing device 104. For example, when challenge selector 124 receives a challenge validation request to a challenge, the challenge selector 124 may match some or all of the answer provided in the challenge validation request to the answer in the challenge context. In an embodiment, in addition to challenge context, challenge selector 124 may also store the request for which the challenge selector 124 generated a challenge.

At operation 320, challenge selector 124 passes the response containing the challenge to router 120.

At operation 322, router 120 transmits the response containing the challenge to application 108.

At operation 324, application 108 receives the response containing the challenge.

At operation 326, interceptor 116 intercepts the response and determines that the response includes a challenge. In an embodiment, interceptor 116 may cause application 108 to render the challenge, using, for example a challenge widget included in application 108. The rendered challenge may be displayed on the screen of computing device 104. The rendered challenge may be "reCAPTCHA" or "CAPT-CHA", or a silent JavaScript challenge in some embodiments.

FIG. 4 is a sequence diagram 400 that processes a response to an issued challenge, according to an embodiment. Sequence diagram 400 may be implemented using components described in FIG. 1.

At operation 402, application 108 issues a request that includes an answer to the challenge. For example, application 108 may receive an input that includes an answer to a challenge. For example, application 108 may receive a response from a user using a keyboard, mouse, touch screen, voice, etc. Once received, application 108 may generate a request that includes an answer to the challenge. The challenge validation request may be an HTTP request.

At operation 404, router 120 receives the request that includes the answer to the challenge and forwards the request to challenge selector 124.

At operation 406, challenge selector 124 receives the request that includes the answer to the challenge.

At operation 408, challenge selector 124 may retrieve challenge context from its memory or from challenge context store 126.

At operation 410, challenge selector 124 validates the answer to the challenge in the request by comparing the answer in the request to the challenge received in operation 406 to the answer in the challenge context. If the validation succeeds, the sequence proceeds to operation 412. Otherwise, the sequence in FIG. 3 may be repeated or a challenge failed error be transmitted to application 108.

At operation 412, challenge selector 124 directs router 120 to route the request issued in operation 302 of FIG. 3, retrieved from challenge context store 126, to application 110.

At operation 414, router 120 routes the request of operation 302 of FIG. 3 to application 110.

At operation 416, application 110 receives the request.

At operation 418, application 110 processes the request. For example, application 110 generates a response that includes data or content that may dynamically update webpage 112.

At operation 420, application 110 transmits the response to router 120.

At operation 422, router 120 passes the response to application 108 over network 102.

At operation 424, application 108 receives the response from server 106.

At operation 426, interceptor 116 intercepts the response. Interceptor 116 may determine that the response is a dynamic web content response and passes the response to dynamic engine 114 to process and update webpage 112 accordingly.

Figure 5:
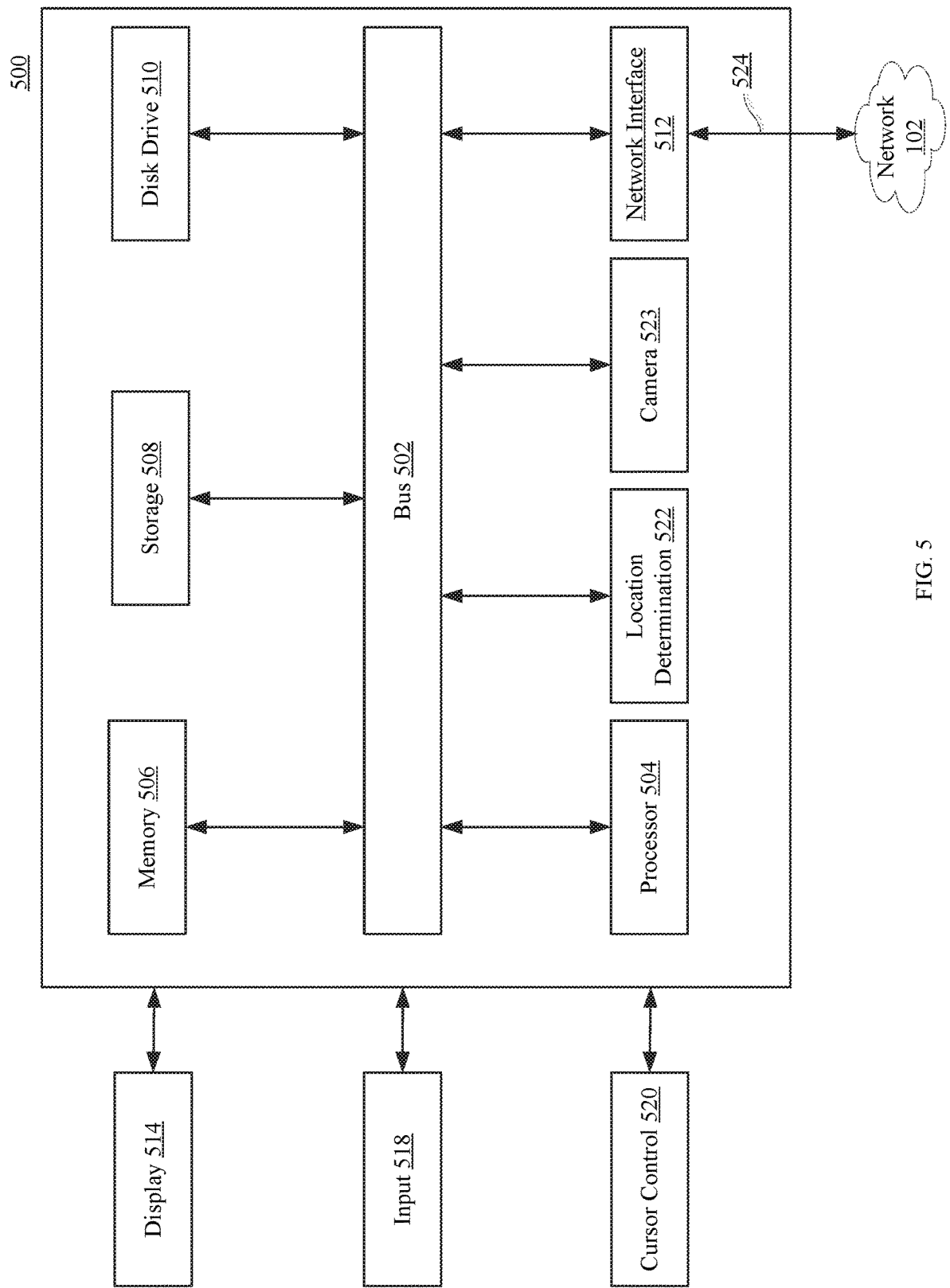
FIG. 5 is a block diagram of a computer system suitable for implementing one or more components in FIGS. 1-4 according to an embodiment.

Referring now to FIG. 5 an embodiment of a computer system 500 suitable for implementing, the systems and methods described in FIGS. 1-4 is illustrated.

In accordance with various embodiments of the disclosure, computer system 500, such as a computer and/or a server, includes a bus 502 or other communication mechanism for communicating information, which interconnects subsystems and components, such as a processing component 504 (e.g., processor, micro-controller, digital signal processor (DSP), graphics processing unit (GPU), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 518 (e.g., keyboard, keypad, or virtual keyboard), a cursor control component 520 (e.g., mouse, pointer, or trackball), a location determination component 522 (e.g., a Global Positioning System (GPS) device as illustrated, a cell tower triangulation device, and/or a variety of other location determination devices known in the art), and/or a camera component 523. In one implementation, the disk drive component 510 may comprise a database having one or more disk drive components.

In accordance with embodiments of the disclosure, the computer system 500 performs specific operations by the processor 504 executing one or more sequences of instructions contained in the memory component 506, such as described herein with respect to the mobile communications devices, mobile devices, and/or servers. Such instructions may be read into the system memory component 506 from another computer readable medium, such as the static storage component 508 or the disk drive component 510. In other embodiments, hard-wired circuitry may be used in place of or in combination with software instructions to implement the disclosure.

Logic may be encoded in a computer readable medium, which may refer to any medium that participates in providing instructions to the processor 504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 510, volatile media includes dynamic memory, such as the system memory component 506, and transmission media includes coaxial cables, copper wire, and fiber optics, including wires that comprise the bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 500. In various other embodiments of the disclosure, a plurality of the computer systems 500 coupled by a communication link 524 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 500 may transmit and receive messages, data, information and instructions, including one or more programs (i.e., application code) through the communication link 524 and the network interface component 512. The network interface component 512 may include an antenna, either separate or integrated, to enable transmission and reception via the communication link 524. Received program code may be executed by processor 504 as received and/or stored in disk drive component 510 or some other non-volatile storage component for execution.

In an embodiment, computer system 500 may also be deployed in a public or a private cloud. When deployed in a public cloud, computer system 500 may execute one or more virtual machines which may host one or more applications or websites (such as application 110) that may be accessible over network 102. When deployed in a private cloud, computing system 500 may be included and operated by a private organization, such as PAYPAL®. For example, computing system 500 may execute challenge selector 124, challenge context store 126, application 110, and anomaly detector 122 using interfaces, software, and hardware that are proprietary to the private organization.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A computing device, comprising:
    a non-transitory memory storing instructions; and
    one or more hardware processors coupled to the non-transitory memory and configured to read the instructions from the non-transitory memory to cause the computing device to perform operations comprising:
        issuing, using an application executing on the computing device, a request to a server, wherein the request comprises a download request for a webpage to the computing device;
        receiving, in response to the request, the webpage and an interceptor code, wherein a dynamic engine is included in the downloaded webpage and the interceptor code is in a JavaScript engine;
        generating an interceptor from the interceptor code on the computing device that executes the application, wherein the interceptor is configured to authenticate subsequent dynamic web content requests that update portions of the received webpage without refreshing an entire webpage;
        issuing, using the dynamic engine, a dynamic web content request to the server, wherein a response to the dynamic web content request is configured to update a portion of the webpage;
        in response to issuing the dynamic web content request, receiving a challenge;
        intercepting, using the interceptor, the challenge, wherein the intercepted challenge is passed to the application;
        rendering, using the application, the challenge;
        receiving an answer to the challenge; and
        receiving a dynamic web content response that updates the portion of the webpage after validating the answer to the challenge.

2. The computing device of claim 1, wherein the dynamic web content request is an asynchronous JavaScript and extensible (AJAX) request.

3. The computing device of claim 1, wherein the operations further comprise:
    intercepting, using the interceptor, the dynamic web content response;
    passing the dynamic web content response to the dynamic engine; and
    updating, using the dynamic engine, the portion of the webpage with content in the dynamic web content response.

4. The computing device of claim 1, wherein the application is a web browser.

5. The computing device of claim 1, wherein the interceptor code is in a JavaScript language.

6. The computing device of claim 1, wherein the interceptor executes within the application.

7. A method, comprising:
    issuing, using an application executing on a computing device, a request to a server, wherein the request comprises a download request for a webpage to the computing device;
    authenticating the request using a first challenge;
    in response to the authenticating the first challenge, downloading the webpage and an interceptor code, wherein a dynamic engine is included in the downloaded webpage and the interceptor code is in a JavaScript engine;
    generating an interceptor from the interceptor code included in the downloaded webpage on the computing device that executes the application, wherein the interceptor is configured to authenticate subsequent dynamic web content requests that update portions of the downloaded webpage without refreshing the webpage;
    generating, using the dynamic engine executing on the computing device, a dynamic web content request to the server, wherein the dynamic web content request requests an update to a portion of the webpage previously downloaded to the computing device that has been previously authenticated with the first challenge;
    receiving, in response to the dynamic web content request, a second challenge;
    using the interceptor, intercepting the second challenge and passing the second challenge to a browser;
    receiving a challenge answer;
    transmitting the challenge answer for validation to the server;

receiving a dynamic web content response that includes an update for the webpage when the server validates the challenge answer; and updating the webpage using the dynamic web content response.

8. The method of claim 7, wherein the dynamic engine is included in the downloaded webpage.

9. The method of claim 7, wherein the interceptor code is in a JavaScript language.

10. The method of claim 7, further comprising:

using the interceptor, intercepting the dynamic web content response; and passing the dynamic web content response to the dynamic engine, wherein the dynamic engine updates the webpage using the dynamic web content response.

11. The method of claim 7, wherein the dynamic web content request is an asynchronous JavaScript and extensible (AJAX) request.

12. A non-transitory machine-readable medium having stored thereon machine-readable instructions executable to cause a machine to perform operations, the operations comprising:

issuing, using an application executing on the computing device, a request to a server, wherein the request comprises a download request for a webpage to the computing device;

receiving, in response to the request, the webpage and an interceptor code, wherein a dynamic engine is included in the downloaded webpage and the interceptor code is in a JavaScript engine;

generating an interceptor from the interceptor code on the computing device that executes the application, wherein the interceptor is configured to authenticate subsequent dynamic web content requests that update portions of the received webpage without refreshing an entire webpage;

issuing, using the dynamic engine, a dynamic web content request to the server, wherein a response to the dynamic web content request is configured to update a portion of the webpage;

in response to issuing the dynamic web content request, receiving a challenge;

intercepting, using the interceptor, the challenge, wherein the intercepted challenge is passed to the application;

rendering, using the application, the challenge;

receiving an answer to the challenge; and receiving a dynamic web content response that updates the portion of the webpage after validating the answer to the challenge.

13. The non-transitory machine-readable medium of claim 12, wherein the dynamic web content request is an asynchronous JavaScript and extensible (AJAX) request.

14. The non-transitory machine-readable medium of claim 12, wherein the operations further comprise:

intercepting, using the interceptor, the dynamic web content response;

passing the dynamic web content response to the dynamic engine; and updating, using the dynamic engine, the portion of the webpage with content in the dynamic web content response.

15. The non-transitory machine-readable medium of claim 12, wherein the application is a web browser.

16. The non-transitory machine-readable medium of claim 12, wherein the interceptor code is in a JavaScript language.

17. The non-transitory machine-readable medium of claim 12, wherein the interceptor executes within the application.

18. The non-transitory machine-readable medium of claim 12, wherein the interceptor executes outside of the application.

19. The non-transitory machine-readable medium of claim 12, wherein the interceptor executes inside of the application.

* * * * *